Figure 1:
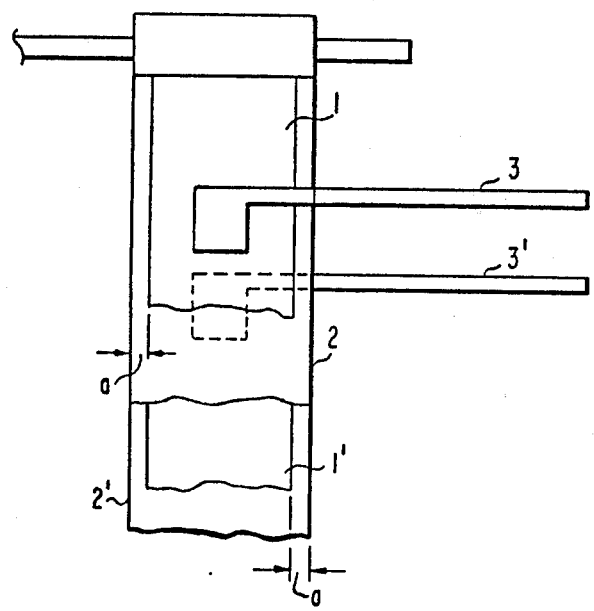

United States Patent [19]

Maruyama et al.

[11] 3,991,451
[45] Nov. 16, 1976

[54] THE METHOD OF MAKING A FLUORIDE FILM CAPACITOR

[75] Inventors: Toshiro Maruyama; Matsuo Hirosawa, both of Nagai; Hajime Ishii, Iwaki; Hiroaki Sato, Nishiki, all of Japan

[73] Assignees: Tokyo Denki Kabushiki Kaisha, Nagai; Kureha Kagaku, Tokyo, both of Japan

[22] Filed: Dec. 13, 1971

[21] Appl. No.: 207,236

Related U.S. Application Data

[63] Continuation of Ser. No. 864,115, Oct. 6, 1969, abandoned.

[30] Foreign Application Priority Data

Oct. 4, 1968 Japan.................................. 43-71805

[52] U.S. Cl.............................. 29/25.42; 252/65; 264/345; 317/258
[51] Int. Cl.[2]....................................... H01G 13/02
[58] Field of Search...................... 317/258; 256/65; 264/345

[56] References Cited
UNITED STATES PATENTS

| 2,405,008 | 7/1946 | Berry | 317/258 U X |
| 2,642,625 | 6/1953 | Peck | 317/258 X |
| 2,735,970 | 2/1956 | Peck | 317/258 X |
| 3,197,538 | 7/1965 | Capron | 317/258 U X |

FOREIGN PATENTS OR APPLICATIONS

| 1,108,234 | 3/1968 | United Kingdom | 317/258 |

OTHER PUBLICATIONS

Duckert, "The Characteristics of Kynac Polyvinylidene Flouride As An Insulating Material" in wire 2-64, pp. 235–239.

Primary Examiner—E. A. Goldberg

[57] ABSTRACT

An organic film capacitor element comprising a dielectric polyvinylidene fluoride film, elongated and subsequently heat treated, and an electrode foil and a method for preparing same are disclosed.

3 Claims, 9 Drawing Figures

METHOD OF MAKING A FLUORIDE FILM CAPACITOR

This application is a continuation of Ser. No. 864,115 filed on Oct. 6, 1969 now abandoned.

BACKGROUND OF THE INVENTION

1. Field of the Invention

This invention relates to an electric capacitor using a polyvinylidene fluoride film as a dielectric.

2. Description of the Prior Art

Of late communication devices, such as radios, televisions and tape recorders, have gradually been miniaturized using transistors, integrated circuits, and the like. Accordingly, it is necessary that the electrical component parts used in these devices be miniaturized also. With organic film capacitors, many efforts in miniaturization have been made to satisfy this requirement, such as simplifying the armor, thinning the dielectric film, or developing a film having a high dielectric constant.

However, the miniaturization of an electric capacitor by simplifying its armor is necessarily limited due to the necessity of retaining the heat resistance and humidity resistance characteristics. As a result miniaturization is difficult.

Previous attempts to thin a polyester film to 4 microns and a polycarbonate film to 2 microns have generally been unsatisfactory because the defects in the film itself are increased and making a capacitor is very difficult by such thinning. A film having a high dielectric constant is a polyvinyl fluoride film and a polyvinylidene fluoride film. These films are generally thinned by the use of solvents and have a dielectric constant of about 6 to 8, that is, about 2 to 3 times as much as the dielectric constant of known organic films for capacitors. For example, a polyethylene film has a dielectric constant of 2.2; polypropylene film 2.1; polystyrene film 2.6; polyester film 3.2; and polycarbonate film 3.0. These films are not practical to use as a dielectric, because the electrical characteristics of the capacitor utilizing them are inferior. Such capacitors have a dielectric loss of 2 to 3%, a volume resistivity of 1 to 3 × $10^{14}$ Ω-cm, a dielectric breakdown strength of 90 to 120 kilovolts/mm. (KV/mm) and electrically defective points such as conductive fine particles and 20 or more pinholes per square centimeter. The dimensional stability is poor, having a heat shrinkage ratio of 6% or larger at 100° C. or 15% or larger at 150° C., resulting in the dielectric film being shrunk and deformed by the high temperatures used during capacitor making and resulting in an incomplete connection with an outgoing terminal.

DESCRIPTION OF THE INVENTION

The present invention provides a thin organic film capacitor having good dielectrical characteristics, in which the above mentioned disadvantages are overcome. The polyvinylidene fluoride film obtained by a melt extruding method is elongated in at least one direction and subjected to heat treatment to improve its electrical characteristics and dimensional stability, and the ease in making the capacitor.

In accordance with the invention, a polyvinylidene film capacitor is prepared by thinning a polyvinylidene fluoride film using the so-called melt extruding method without using any solvent, elongating the extruded film in at least one direction, and then subjecting the film to heat treatment to improve the dielectric constant to a value of from 10 to 18, the dielectric loss to a level of from 0.6 to 1.0%, the volume resistivity to a level of from 1 to 5 × $10^{15}$ Ω-cm, the dielectric breakdown strength to a level of from 250 to 350 KV/mm, and the electrically defective points, such as conductive particles and pinholes to a level of 0.2 or less per square centimeter and the dimensional stability to a level such that the heat shrinkage in the maximum direction is 2% or less at 100° C., and 7% or less at 150° C.

In order to obtain the foregoing electric characteristics, it is necessary to elongate a polyvinylidene fluoride film obtained by melt extruding in at least one direction at a temperature of lower than 170° C, preferably the film is elongated both in length and width at a temperature of lower than 170° C., to a length of 2 or more times as much as the minimum original dimension. Moreover, the heat treatment at from 120° to 175° C must be carried out after elongation so as to improve its dimensional stability.

Figure 2:
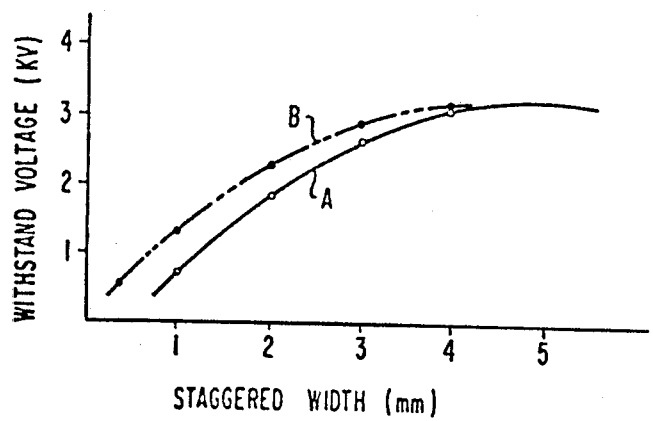
Figure 3:
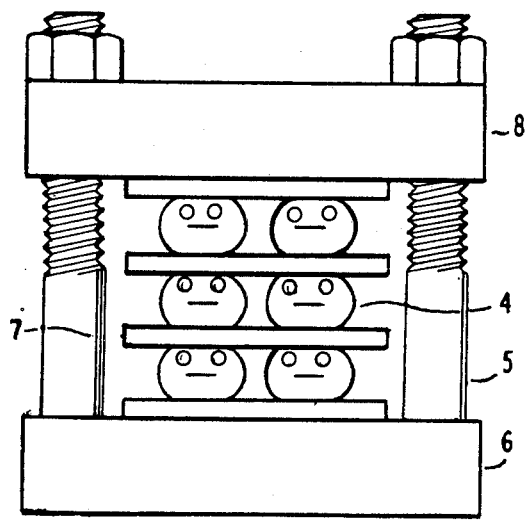
Figure 4:
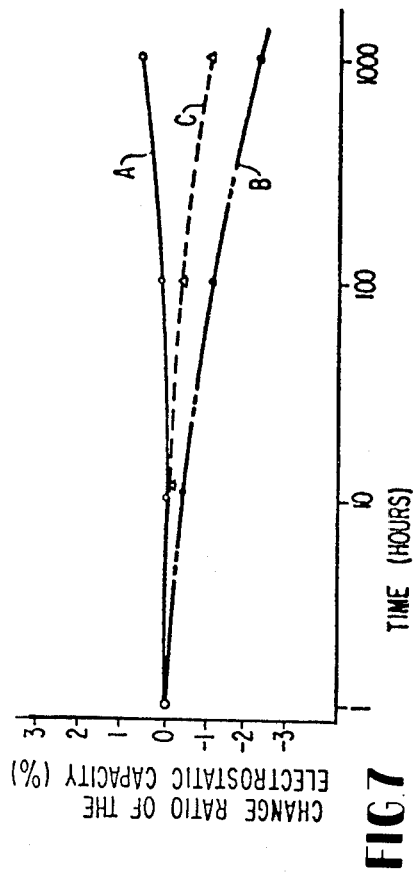
Figure 5:
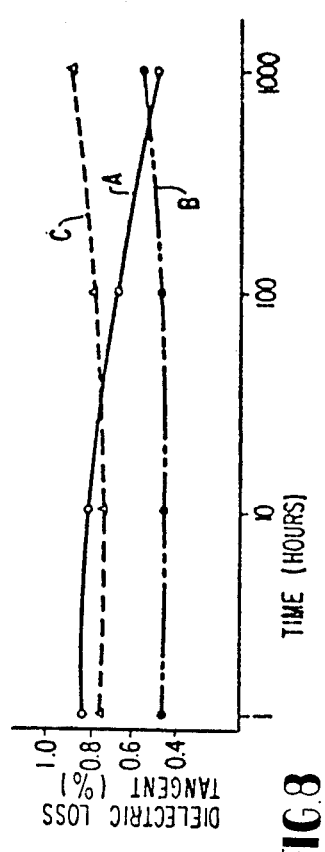
Figure 6:
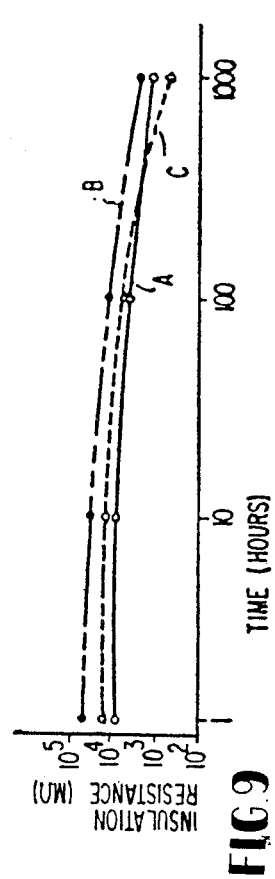
Figure 7:
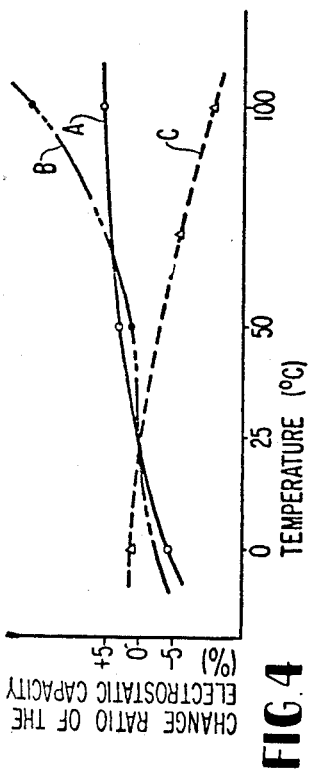
Figure 8:
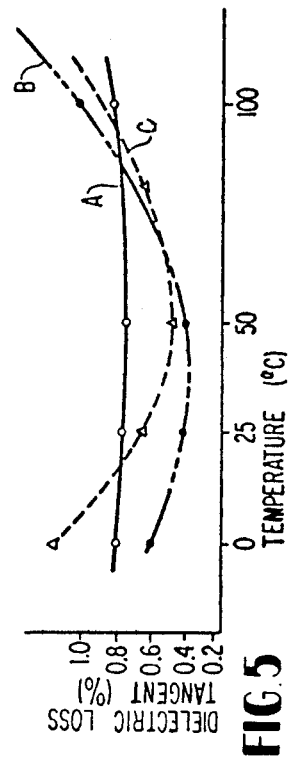
Figure 9:
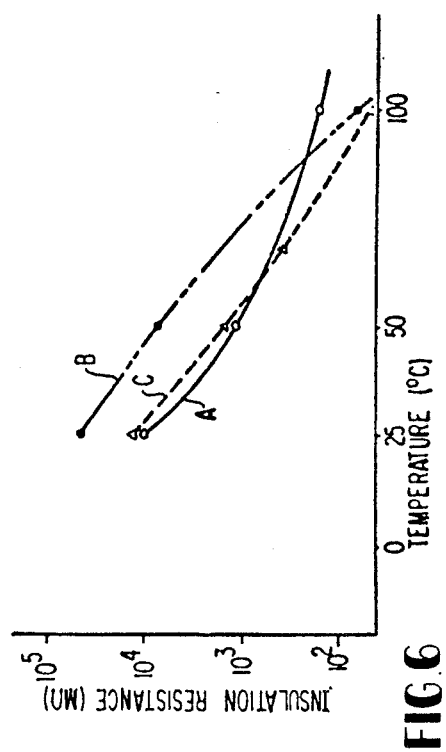

The organic film capacitor of this invention using the polyvinylidene fluoride film, made as described above, as a dielectric will now be illustrated in detail by reference to the accompanying drawing in which:

FIG. 1 is a perspective view of one embodiment of the organic film according to this invention, FIG. 2 is a graph showing the relationship of the staggered width of the electrode foil to the withstand voltage of the foregoing capacitor, FIG. 3 is a vertical cross-sectional view of a fastened state of the foregoing capacitor, FIG. 4 is a graph showing the change in the electrostatic capacity with change in temperature, FIG. 5 is a graph showing the change in the dielectric loss tangent with change in temperature, FIG. 6 is a graph showing the change in the insulation resistance with change in temperature, FIG. 7 is a graph showing the change in the electrostatic capacity with change in the voltage applying time, FIG. 8 is a graph showing the change in the dielectric loss tangent with change in the voltage applying time, and FIG. 9 is a graph showing the change in the insulation resistance with change in the voltage applying time.

Referring now to FIG. 1, dielectric films 2,2', consisting of electrode foils 1,1' of aluminum or tin and polyvinylidene fluoride film having the foregoing electric characteristics and dimensional stability, are alternated and wound and simultaneously, outgoing terminals 3,3' are inserted. The tension of dielectric films 2,2' during the winding is preferably 30 the polyvinylidene per centimeter of film width or less which corresponds to about one-half or less as much tension as is used with the known organic film capacitors during winding. Because the polyvinylidene fluoride film is relatively soft this serves to prevent formation of wrinkles and deterioration of the characteristics of the capacitor due to scratching of the surface of dielectric films 2,2' caused by the roughness of the roller of the winding device or by the adhesion of dust to the film. The staggered width of the electrode foils 1,1' and the dielectric films 2,2', i.e., dimension a in FIG. 1 must be from 1.0 to 4.5 mm. which corresponds to 30 to 70% that of known organic film capacitors. This serves to prevent creeping discharge as a result of the large dielectric constant of the polyvinylidene fluoride film used and to prevent short circuiting due to heat shrinkage, in raising the withstand voltage. As can be seen from the relation of the staggered width and the withstand voltage in FIG. 2, a capacitor using the polyvinylidene fluoride film (Curve A) has a larger staggered width than a capacitor using the known polyester film (Curve B). A staggered width of 1.0 mm. or more is necessary for a withstand voltage of 500 V. or more, while a staggered width of 4.5 mm. or more results in no greater effect with a less effective electrode width. Therefore, the optimum staggered width for increasing the withstand voltage and increasing the effective electrode width is from 1.0 to 4.5 mm.

As shown in FIG. 3, wound capacitor elements 4 are stacked on fixed plate 6 of fastening means 5 in several stages through partition plates 7 with several capacitor elements to each stage, fastened by fastening plate 8 under a pressure of from 15 to 35 kg/cm² and allowed to stand for 5 minutes or more at a temperature of from 60° to 130° C, thus removing the dimensional restoring property of the capacitor. When the fastening pressure is less than 15 kg/cm², the air present between electrode foils 1,1' and dielectric films 2,2' is not completely removed from the capacitor elements and as a result the dielectric constant characteristic of the polyvinylidene fluoride film is not used at its maximum and capacitor elements 4 tend to be restored to the former state, resulting in poorer capacitance. When the fastening pressure is greater than 35 kg/cm²., scratching of the dielectric films 2,2' by the fins of the outgoing terminals 3,3' increases causing deterioration of the characteristics of the capacitor.

At a heating temperature of lower than 60° C., the restoring property of capacitor element 4 can result in an incomplete formation and capacitor element 4 cannot be dried sufficiently. On the other hand, at a temperature higher than 130° C, heat shrinkage of the dielectric films 2,2' occurs resulting in fluctuation of the electrical characteristics, such as electrostatic capacity, insulation resistance and withstand voltage.

The heating time is preferably 5 minutes or more with good forming and drying effect, although this will epend upon the size and shape of capacitor element 4, the fastening pressure and the heating temperature. If necessary, capacitor element 4, thus formed, in a flat state is armored and finished. Since the polyvinylidene fluoride film is swelled or partly dissolved on contact with some organic solvents such as amines, benzene derivatives, and ketones and in particular, ethyl amine, benzaldehyde and acetaldehyde, which causes deterioration of its characteristics, it is necessary to use high melting point waxes, liquid polyester resins, acryl resins and polyparaxylene resins free of these organic solvents as the armoring material. A liquid epoxy resin is commonly used as an armoring material for organic film capacitors and in this situation it is desirable to undercoat with the foregoing armoring material.

The present invention is applicable to not only the so-called electrode foil type of capacitor in which electrode foils and dielectric films are superimposedly wound, but also the so-called electrode vapor deposition type of capacitor in which the dielectric films are vapor deposited with a metal and then wound. Where a metal is vapor deposited onto a polyvinylidene fluoride film, the vapor deposition strength can be improved by subjecting the film to a surface treatment, such as by corona discharge, prior to the vapor deposition. The staggered width of the electrode vapor deposition type capacitor using polyvinylidene fluoride film is such that the dielectric film used has a non-vapor-deposited area on one edge of the film of a dimension (in some cases, including the staggered width) of from 1.0 to 4.5 mm. and then superimposedly wound.

Fastening after winding is not always necessary. Even though no fastening pressure is used, the dielectric constant characteristic of the polyvinylidene fluoride film can be substantially utilized. Of course, application of a fastening pressure results in a more efficient capacitor essentially equal to that of the electrode foil type. Moreover, in the electrode vapor deposition type capacitor, an electrically conductive point or metal, such as aluminum, zinc or tin, is applied to both of the end surfaces of the wound capacitor element by which outgoing electrodes are provided and to which lead wires can be connected. Application of the outgoing electrodes and lead wires must be carried out at a temperature lower than 180° C. because the softening temperature of the polyvinylidene fluoride film is about 180° C. Consequently, use of a higher temperature causes shrinkage or deformation of the dielectric film resulting in a short circuiting of the electrodes and an incomplete connection of the lead wires. Therefore, for the electrode vapor deposition type of capacitor the thermal dimensional stability of the polyvinylidene fluoride film is improved after elongation of the film by subjecting the film to heat treatment.

In Table 1 a capacitor utilizing a non-heat treated polyvinylidene fluoride film and second capacitor utilizing a heat-treated polyvinylidene fluoride film are compared.

TABLE 1

| Film Treatment | | Film Used | | | Condenser Type | |
|---|---|---|---|---|---|---|
| Degree of elongation of film | Heat treatment used | Heat shrinkage ratio 100° C (%) | 150° C (%) | Dielectric constant | Electrode Foil | Electrode Vapor Deposition |
| FILM 1 Elongated at 160° C. in area by factor of 15 | Non-heat treated | 4.5* 2.3** | 14* 8.5** | 13.5 | Deformed in the fastening and heating step to decrease the static capacity ($\epsilon_o$ = 7 to 8) | Short circuited in the electrode applying step |
| FILM 2 Elongated at 160° C. in area by factor of 15 | Heat-treated | 0.8* | 2.7* | 13.6 | Normal static capacity ($\epsilon_o$ = 12.8) | Normal static capacity ($\epsilon_o$ = 13.2) |

TABLE 1-continued

| Film Treatment | | Film Used | | | Condenser Type | |
|---|---|---|---|---|---|---|
| Degree of elongation of film | Heat treatment used | Heat shrinkage ratio 100° C (%) | 150° C (%) | Dielectric constant | Electrode Foil | Electrode Vapor: Depostion |
| | | 0.4** | 3.7** | | | |

*Length direction;
**Width direction
$\epsilon_o$ is the overall dielectric constant calculated from the measured capacity values of the capacitor.

As is evident from Table 1, the capacitor using the film of this invention made as above-described using a polyvinylidene fluoride film elongated in at least one direction and subjected to heat treatment as the dielectric film, does not possess the disadvantages of a decrease in electrostatic capacity and short circuiting and is capable of utilizing the entire dielectric constant characteristic of the polyvinylidene fluoride film.

In Table 2 the volumes of the polyvinylidene fluoride film capacitors made according to this invention are compared to the volumes of condensers made with other organic film capacitors and with paper capacitors.

Table 2

| | Dielectric Used | | | |
|---|---|---|---|---|
| Type of Condenser | Polyvinylidene fluoride film | Polyester film | Polypropylene film | Paper |
| Electrode foil type | 3.24 cm³ | 13.0 cm³ | 21.0 cm³ | 16.8 cm³ |
| Electrode vapor deposition type | 1.7 cm³ | 7.14 cm³ | 11.5 cm³ | 5.84 cm³ |

The dielectrics used above for all the capacitors have a thickness of 9 microns and nominal static capacity of 0.2 $\mu$F.

As can be seen from Table 2 the capacitor of this invention using a polyvinyldiene fluoride film, whose electrical characteristics and dimensional stability are thus improved, as the dielectric film can be miniaturized to from ⅓ to 1/7 of the volume of capacitors having the same capacity using other organic films or paper.

In FIG. 4 to FIG. 9 comparisons of the polyvinylidene fluoride film capacitor of this invention (Rating: 250 WV. DC-0.2 $\mu$F) (A) with the known polyester film capacitor (Rating: 250 WV. DC-0.2 $\mu$F) (B) and MP (Metallized Paper) capacitor (Rating: 250 WV. DC-0.2 $\mu$F) (C) are shown. In FIG. 4, Curve A shows a smaller change ratio (%) in the electrostatic capacity with change in temperature compared to curves B and C. In FIG. 5, Curve A shows a substantially constant dielectric loss tangent over a wide temperature range, i.e. a smaller change in the dielectric loss tangent with change in temperature, as compared with Curves B and C. In FIG. 6, Curve A shows a smaller change of the insulation resistance with change in temperature, in particular, higher insulation resistance at a high temperature (100° C.) as compared with Curves B and C. In FIG. 7, Curve A shows a smaller change ratio (%) in the electrostatic capacity with passage of time when applying a rated voltage at 80° C. as compared with Curves B and C, i.e. substantially constant electrostatic capacity even after the application for 1000 hours. In FIG. 8, Curve A shows a gradual decreasing in the dielectric loss tangent with passage of time when applying a rated voltage at 80° C. as compared with Curves B and C. In FIG. 9, Curve A shows a smaller change in the insulation resistance with the passage of time when applying a rated voltage at 80° C. as compared with Curves B and C, i.e. substantially constant insulation resistance even after the application for 1000 hours.

As is apparent from the foregoing detailed illustration, the present invention provides an organic film capacitor whose volume is markedly reduced and whose electrical characteristics are stabilized by improving the electric characteristics and thermal dimensional stability of a polyvinylidene fluoride film which was not available for use as a dielectric film as a capacitor in the prior art and simultaneously provides a capacitor using this polyvinylidene fluoride film as a dielectric film.

What is claimed is:

1. The method of forming a wound flat capacitor comprising the steps of (1) forming a dielectric film and electrode means into a wound capacitor element, the dielectric film comprising a polyvinylidene fluoride film which has been elongated in at least one direction and subsequently heat treated (2) subjecting the capacitor element to a pressure of from 15 to 35 kilograms per square centimeter of film width and (3) allowing the element to stand for at least 5 minutes at a temperature of from 60° C to 130° C.

2. The method of claim 1 wherein said polyvinylidene fluoride film is elongated at a temperature of less than 170° C. in both the length and width directions to a length of at least 2 times the original dimensions in both the length and width directions.

3. The method of claim 2 wherein said subsequent heat treatment is performed at a temperature of from 120° to 175° C.

* * * * *